UNITED STATES PATENT OFFICE.

EDWARD OLSON, OF JEWELL JUNCTION, IOWA.

STUCCO FOR PLASTERING.

SPECIFICATION forming part of Letters Patent No. 445,264, dated January 27, 1891.

Application filed December 6, 1890. Serial No. 373,791. (No specimens.)

*To all whom it may concern:*

Be it known that I, EDWARD OLSON, a citizen of the United States, residing at Jewell Junction, in the county of Hamilton and State of Iowa, have invented a new and useful Stucco for Plastering, of which the following is a specification.

This invention relates to a composition of matter for mixing stucco for plastering purposes; and it consists of the following ingredients in the proportions hereinafter set forth, to wit: hickory-bark, one ounce; slippery elm bark, one ounce; pine-tar, one ounce; alum, one-half ounce; white glue, four ounces. In lieu of the latter ingredient, one tea-spoonful of skunk-oil may be used.

The above-named ingredients are to be thoroughly mixed with one pint of water and boiled until the latter is reduced to one-half pint. The material is then strained into twenty pints of pure water and the compound is then ready for use.

In using my improved compound ordinary stucco and sand are mixed in equal quantities and moistened with the liquid compound to the proper consistency. It may then be used in the ordinary manner for plastering, one or more coats being applied, as may be desired.

This compound may be used in lieu of cement for floors, walls, ceilings, and the like, and it will set and harden very quickly. A facing of plaster-of-paris moistened with the same liquid may, when desired, be applied as a finishing, and this facing may be mixed with coloring-matter or pigment of any desired kind. The coloring-matter, instead of being mixed with the plaster, may be afterward applied as a paint, and the surface may be finely polished with castor-oil mixed with Brazilian-gum mucilage.

Having thus described my invention, what I claim is—

The herein-described compound, consisting of a decoction of hickory-bark, slippery-elm bark, pine-tar, alum, Brazilian gum, and white glue, with water, in about the proportions described, for the purpose set forth.

In testimony that I claim the foregoing as my own I have hereto affixed my signature in presence of two witnesses.

EDWARD OLSON.

Witnesses:
J. M. BLAKE,
S. H. BROWN.